United States Patent
Lin et al.

(10) Patent No.: US 11,895,434 B2
(45) Date of Patent: Feb. 6, 2024

(54) VIDEO PROCESSOR CHIP AND VIDEO PROCESSING METHOD

(71) Applicant: REALTEK SEMICONDUCTOR CORPORATION, Hsinchu (TW)

(72) Inventors: Ying-Hsin Lin, Hsinchu (TW); Wen-Hsia Kung, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 3 days.

(21) Appl. No.: 17/488,344

(22) Filed: Sep. 29, 2021

(65) Prior Publication Data
US 2022/0132072 A1     Apr. 28, 2022

(30) Foreign Application Priority Data
Oct. 26, 2020   (TW) .................... 109137052

(51) Int. Cl.
| | | |
|---|---|---|
| *H04N 7/01* | (2006.01) | |
| *H04N 5/78* | (2006.01) | |
| *H04N 5/91* | (2006.01) | |

(52) U.S. Cl.
CPC ............ *H04N 7/013* (2013.01); *H04N 5/78* (2013.01); *H04N 5/91* (2013.01)

(58) Field of Classification Search
CPC ............ H04N 7/013; H04N 5/78; H04N 5/91; H04N 7/0105; H04N 7/0127; H04N 5/783;
(Continued)

(56) References Cited

U.S. PATENT DOCUMENTS

| | | | |
|---|---|---|---|
| 2011/0128439 A1* | 6/2011 | Chang | G09G 3/3611 348/E7.003 |
| 2016/0173847 A1* | 6/2016 | Staudenmaier | G11B 31/006 386/207 |
| 2018/0324455 A1 | 11/2018 | Nakagami et al. | |

FOREIGN PATENT DOCUMENTS

| | | |
|---|---|---|
| CN | 102396228 A | 3/2012 |
| CN | 105657291 A | 6/2016 |

OTHER PUBLICATIONS

OA letter of the counterpart TW application (appl. No. 109137052) mailed on Dec. 8, 2021. Summary of the OA letter: (1) Claims 1-10 are rejected as allegedly being unpatentable in view of cited reference 1 (CN 105657291 A) and cited reference 2 (CN 102396228 A, also published as US 2018/0324455 A1). Correspondence bewteen claims of TW counterpart application and claims of US application: (1)Claims 1-5 and 6-10 in TW counterpart application correspond to claims 1-5 and 8-12 in US application, respectively.

* cited by examiner

*Primary Examiner* — Michael E Teitelbaum
(74) *Attorney, Agent, or Firm* — WPAT, P.C

(57) ABSTRACT

A video processor chip includes a memory circuit, a frame rate converter circuit, and an image compensation circuit. The memory circuit includes first to third storage spaces. The frame rate converter circuit sequentially writes multiple frame data in video data to the first to the third storage spaces respectively, and reads second data in the frame data from the memory circuit to perform a frame rate conversion when first data in the frame data is written to the memory circuit. The second data is a previous frame data of the first data. The image compensation circuit reads third data in the frame data from the memory circuit when the frame rate converter circuit reads the second data, and performs an image compensation according to a difference between the second data and the third data. The third data is a previous frame data of the second data.

14 Claims, 3 Drawing Sheets

(58) Field of Classification Search
CPC .................. G09G 3/2011; G09G 5/10; G09G 2320/0252; G09G 2340/0435; G09G 2340/16; G09G 2360/18; G09G 5/399
See application file for complete search history.

VIDEO PROCESSOR CHIP AND VIDEO PROCESSING METHOD

BACKGROUND

1. Technical Field

The present disclosure relates to a video processor chip. More particularly, the present disclosure relates to a video processor chip and a video processing method that are able to save a bandwidth of a memory.

2. Description of Related Art

With the increase of the specification of video data (or display panel), cost and/or difficulty of implementing hardware for processing video data are getting higher. For example, in a current video processor chip, multiple processing circuits are required to read and write a memory circuit simultaneously. When the specification of the video data (or the display panel) is higher, data amount required to be transferred in a single time will be higher. Therefore, in order to process the video data with high specification, the current video processor chip is required to employ a memory circuit having high bandwidth.

SUMMARY

In some aspects, a video processor chip includes a memory circuit, a frame rate converter circuit, and an image compensation circuit. The memory circuit includes a first storage space, a second storage space, and a third storage space. The frame rate converter circuit is configured to sequentially write a plurality of frame data in video data to the first storage space, the second storage space, and the third storage space, respectively, and read second data in plurality of frame data from the memory circuit to perform a frame rate conversion when first data in the plurality of frame data is written to the memory circuit, in which the second data is a previous frame data of the first data. The image compensation circuit is configured to read third data in the plurality of frame data from the memory circuit when the frame rate converter circuit reads the second data, and perform an image compensation according to a difference between the second data and the third data, in which the third data is a previous frame data of the second data.

In some aspects, a video processing method includes the following operations: sequentially writing a plurality of frame data in video data to a first storage space, a second storage space, and a third storage space, respectively, of a memory circuit; reading second data in plurality of frame data from the memory circuit to perform a frame rate conversion when first data in the plurality of frame data is written to the memory circuit, in which the second data is a previous frame data of the first data; and reading third data in the plurality of frame data from the memory circuit when the second data is read in response to the frame rate conversion, and performing an image compensation according to a difference between the second data and the third data, wherein the third data is a previous frame data of the second data.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuitry" may indicate a system formed with one or more circuits. The term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, like elements in various figures are designated with the same reference number.

Figure 1:
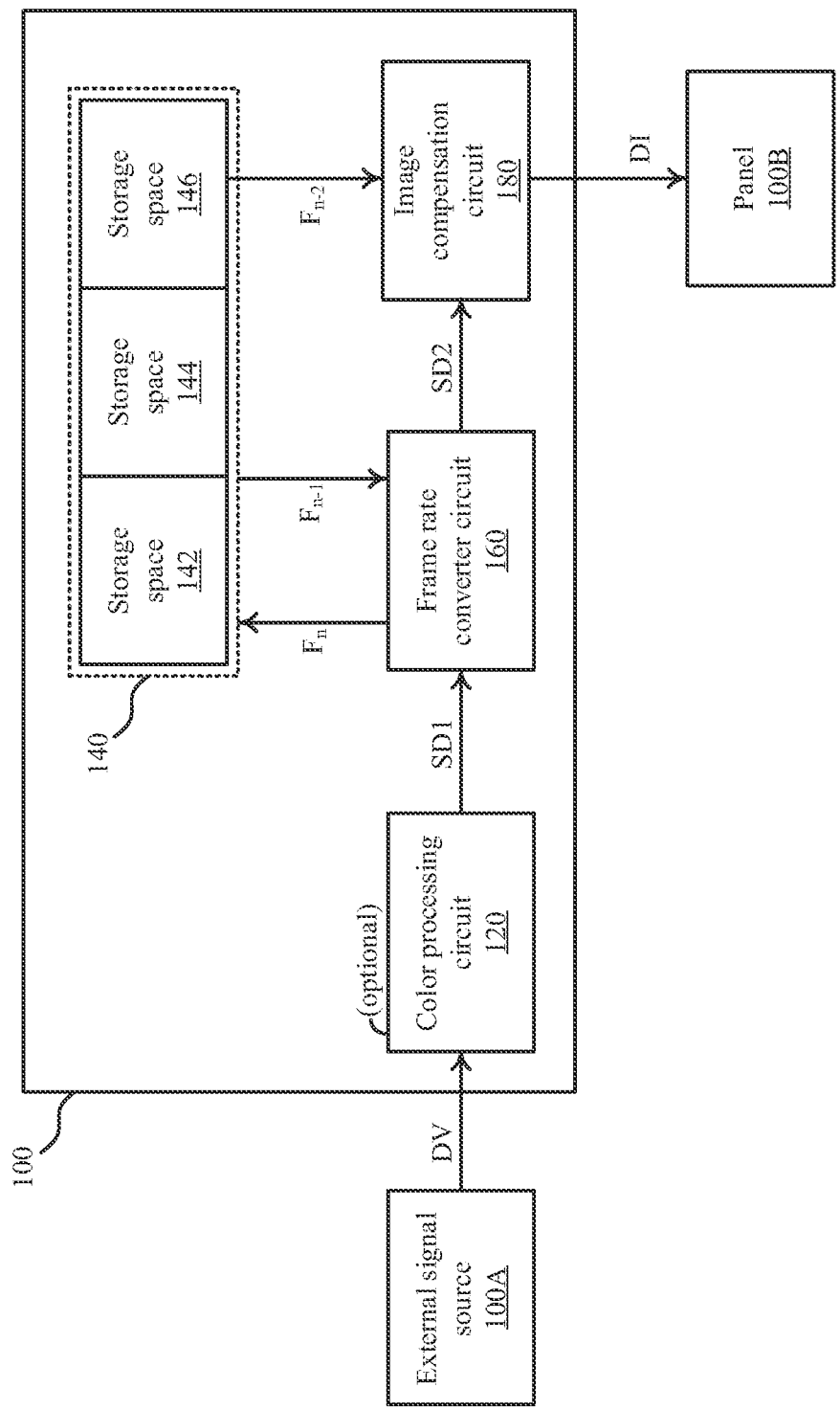
FIG. 1 is a schematic diagram of a video processor chip according to some embodiments of the present disclosure.

FIG. 1 is a schematic diagram of a video processor chip 100 according to some embodiments of the present disclosure. In some embodiments, the video processor chip 100 may be (but not limited to) a scaler integrated circuit.

The video processor chip 100 is coupled to an external signal source 100A to receive video data DV and is coupled to a panel 100B to transmit video data DI to a timing controller circuit (not shown in the figure) in the panel 100B. As a result, the timing controller circuit may drive the panel 100B to display corresponding image(s) according to the video data DI. In some embodiments, the video processor chip 100 includes a color processing circuit 120, a memory circuit 140, a frame rate converter circuit 160, and an image compensation circuit 180.

The color processing circuit 120 receives the video data DV from the external signal source 100A, and performs a color processing on the video data DV, and generates a data signal SD1. In some embodiments, the color processing circuit 120 may be optional. In some embodiments where the color processing circuit 120 is not employed, the video data DV may considered as the data signal SD1 and is inputted to the frame rate converter circuit 160.

The memory circuit 140 is coupled to the frame rate converter circuit 160 and the image compensation circuit 180. The memory circuit 140 includes storage spaces 142, 144, and 146. The frame rate converter circuit 160 sequentially writes multiple frame data in the video data DV to the storage spaces 142, 144, and 146, respectively. The frame rate converter circuit 160 reads the previously stored frame data from the memory circuit 140 according to a frame rate supported by the panel 100B, in order to perform a frame rate conversion.

In some embodiments, the frame rate converter circuit 160 is coupled to the color processing circuit 120 to receive the data signal SD1, and acquires multiple frame data (which may be frame data have been processed by the color processing circuit 120) in the video data DV according to the data signal SD1, in order to perform the frame rate conversion to generate a data signal SD2. In some embodiments, when the frame rate converter circuit 160 writes a first data (labeled as $F_n$) in the multiple frame data, the frame rate converter circuit 160 reads the memory circuit 140 a second data (labeled as $F_{n-1}$) in the multiple frame data, in which the second data $F_{n-1}$ is a previous frame data of the first data $F_n$. Detailed operations regarding herein are given with reference to FIG. 2.

In some embodiments, the multiple frame data are multiple successive image data, the second data $F_{n-1}$ may be a n-th image data in the multiple image data (in which n is a positive integer greater than or equal to 1), and the first data $F_n$ is a (n+1)-th image data. In other words, the first data $F_n$ may be a next image data that follows the second data $F_{n-1}$.

The image compensation circuit 180 is configured to perform an image compensation, in order to increase a response speed of the panel 100B. In some embodiments, the image compensation is an overdrive operation. For example, if a change in the grayscale values of the same pixel in two consecutive frame data exceeds a predetermined value, the image compensation circuit 180 may perform the image compensation, in order to adjust data values of the video data DI. The panel 100B may increase the driving voltage of the pixel according to the video data DI, in order to increase the response speed of the pixel. As a result, it is able to prevent images displayed by the panel 100B from having motion blur.

In some embodiments, a implementation of the image compensation circuit 180 may be understood with reference to the following information: https://en.wikipedia.org/wiki/Response_Time_Compensation, but the present disclosure is not limited thereto.

In some embodiments, the image compensation circuit 180 is configured to read third data (labeled as $F_{n-2}$) in the multiple frame data from the memory circuit 140 when the frame rate converter circuit 160 reads the second data $F_{n-1}$, and performs the image compensation according to a difference between the second data $F_{n-1}$ and the third data $F_{n-2}$, in which the third data $F_{n-2}$ is a previous frame data of the second data $F_{n-1}$. In some embodiments, the multiple frame data are successive image data, the second data $F_{n-1}$ is a n-th image data in the successive image data, and the third data $F_{n-2}$ a (n-1)-th image data in successive image data. In other words, the second data $F_{n-1}$ may be a next image data that follows the third data $F_{n-2}$. By analyzing the difference between the second data $F_{n-1}$ and the third data $F_{n-2}$, whether the change of the grayscale value of the pixel is too much can be determined, in order to provide the corresponding compensation when the panel 100B displays image(s) corresponding to the third data $F_{n-2}$. In some embodiments, the frame rate converter circuit 160 may output received second data $F_{n-1}$ (e.g., a part of data signal SD2) to the image compensation circuit 180, in order to perform image compensation. Detailed operations regarding herein will be provided with reference to FIG. 2.

In some embodiments, the image compensation circuit 180 is coupled to the frame rate converter circuit 160 to receive the data signal SD2, and acquires the multiple frame data (which may frame data have been processed by the color processing circuit 120 and/or the frame rate converter circuit 160) in the video data DV according to the data signal SD2, and performs the image compensation according to these frame data to generate the video data DI. In some embodiments, the image compensation circuit 180 may be selectively activated. If the image compensation circuit 180 is not activated, the frame rate converter circuit 160 may output the data signal SD1 to be the video data DI.

In some related approaches, in order to perform the frame rate conversion and the image compensation, both of the frame rate converter circuit and the image compensation circuit perform data-reading and data-writing to the memory circuit. In these approaches, the bandwidth of the memory circuit is required to support the frame rate converter circuit and the image compensation circuit to simultaneously perform data-writing and data reading. With the increase of video and/or panel specifications (e.g., resolution is 5K and frame rate is 60 FPS (frame per second)), the bandwidth of the existing memory circuit is insufficient to support the frame rate converter circuit and the image compensation circuit in these approaches.

Compared with the above approaches, in some embodiments of the present disclosure, the image compensation circuit 180 does not write the frame data in the video data DV to the memory circuit 140. The image compensation circuit 180 may utilize the frame data read from the frame rate converter circuit 160 to perform the image consumption. Compared with the above approaches, the required memory bandwidth for the image compensation circuit 180 is lower. As a result, the bandwidth of the memory circuit 140 allows the frame rate converter circuit 160 and the image compensation circuit 180 to operate simultaneously, and the video processor chip 100 is thus able to be applied to video and/or panel having higher specification.

In some embodiments, each of the color processing circuit 120, the frame rate converter circuit 160, and the image compensation circuit 180 may be (but not limited to) implemented with a digital signal processor circuit, a data buffer circuit, and/or other proper digital circuit(s). In some embodiments, the memory circuit 140 may be a random-access memory, but the present disclosure is not limited thereto. Various types of memories able to store frame data are within the contemplated scope of the present disclosure.

Figure 2:
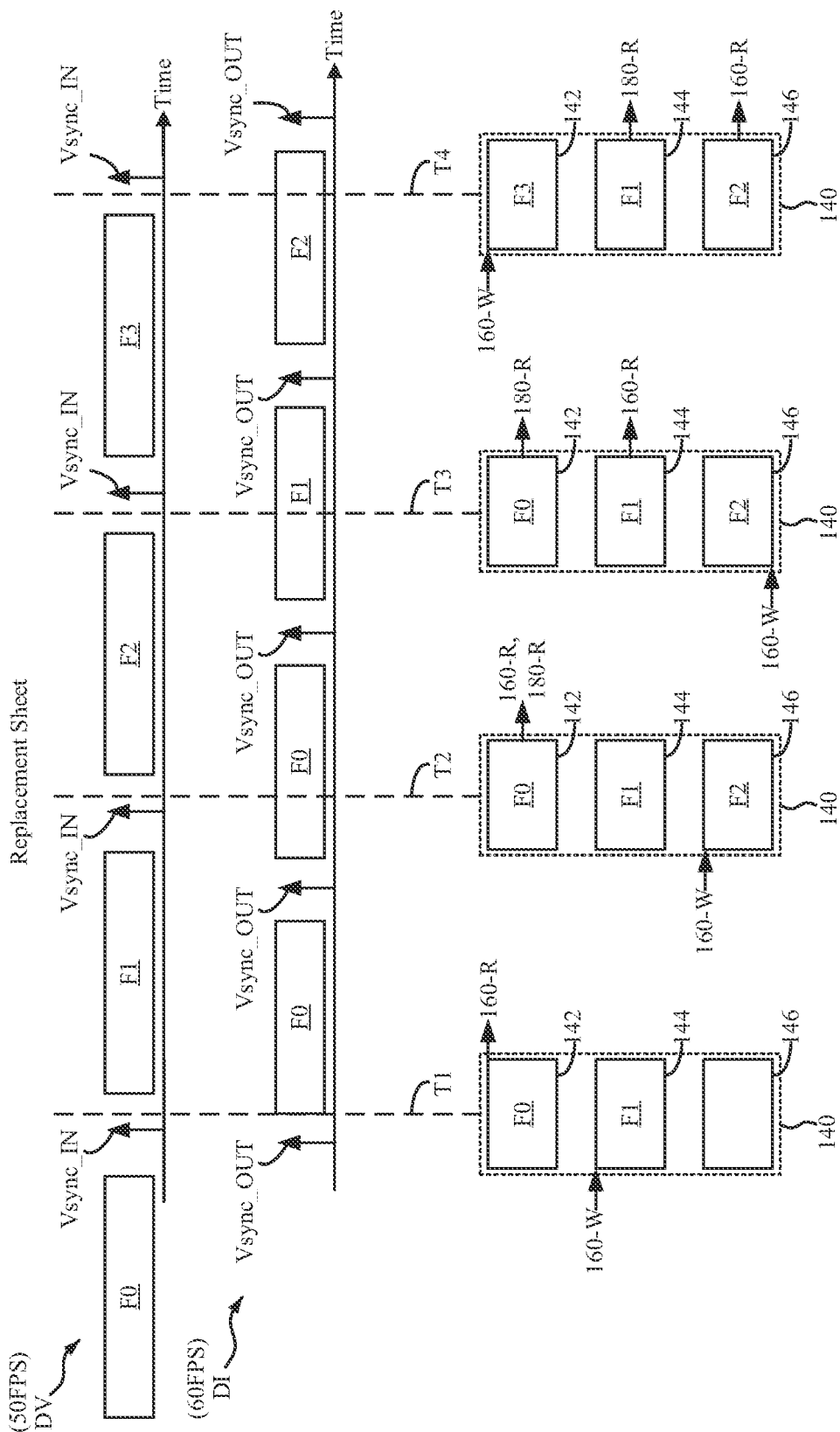
FIG. 2 is a timing diagram of operations performed by the video processor chip in FIG. 1 according to some embodiments of the present disclosure.

FIG. 2 is a timing diagram of operations performed by the video processor chip 100 in FIG. 1 according to some embodiments of the present disclosure. As shown in FIG. 2, the video data includes multiple frame data F0-F3 and vertical synchronization signals Vsync_IN. Each of the frame data F0-F3 is arranged to be in a time interval between two the vertical synchronization signals Vsync_IN. In practical applications, the above time interval may be determined by the external signal source 100A in FIG. 1. Similarly, the video data DI includes vertical synchronization signals Vsync_OUT, and a time interval between the vertical synchronization signals Vsync_OUT is determined by the panel 100B in FIG. 1. In this example, the frame rate of the video data DV is lower than that of the video data DI. For example, the frame rate of the video data DV is 50 FPS, and the frame rate of the video data DI is 60 FPS. As shown in FIG. 2, the interval between the vertical synchronization signals Vsync_OUT is lower than the interval between the vertical synchronization signals Vsync_IN. In other words, in a fixed duration, the video data DI has more frame data. As described in the following paragraphs, the frame rate converter circuit 160 may utilize data reading operation and data writing operation to set timing of outputting the frame data F0-F3, in order to achieve the frame rate conversion.

In some embodiments, the frame rate converter circuit 160 may utilize a write index 160-W to write frame data to the memory circuit 140, and utilize a read index 160-R to read frame data from the memory circuit 140. In some embodiments, the frame rate converter circuit 160 includes at least one register circuit (not shown in figures), which is configured to store values of the write index 160-W and the read index 160-R. In some embodiments, the image compensation circuit 180 may utilize a read index 180-R to read frame data from the memory circuit 140. In some embodiments, the image compensation circuit 180 includes at least one register circuit (not shown in figures), which is configured to store a value of the read index 180-R.

As shown in FIG. 2, prior to time T1, the frame rate converter circuit 160 writes the frame data F0 to the storage space 142. In time T1, the frame rate converter circuit 160 utilizes the write index 160-W to write the frame data F1 to the storage space 144. Moreover, in time T1, the frame rate converter circuit 160 utilizes the read index 160-R to read the frame data F0 from the storage space 142, and outputs the frame data F0 to be the video data DI (i.e., the frame rate conversion).

In time T2, the frame rate converter circuit 160 utilizes the read index 160-R to read the frame data F0 from the storage space 142, and outputs the frame data F0 to be the video data DI (i.e., the frame rate conversion). In time T2, the frame rate converter circuit 160 utilizes the write index 160-W to write the frame data F2 to the storage space 146. Moreover, in time T2, the image compensation circuit 180 utilizes the read index 180-R to read the frame data F0 from the storage space 142. In some embodiments, the image compensation circuit 180 may include at least one data buffer, which is configured to store frame data (e.g., frame data F0) being processed in the image compensation.

In time T3, the frame rate converter circuit 160 utilizes the read index 160-R to read the frame data F1 from the storage space 144, and outputs the frame data F1 to be the video data DI (i.e., the frame rate conversion). In time T3, the frame rate converter circuit 160 finish writing the frame data F2 to the storage space 146. Moreover, in time T3, the image compensation circuit 180 utilizes the read index 180-R to read the frame data F0 from the storage space 142, and compares the received frame data F0 with the frame data F1 outputted from the frame rate converter circuit 160, in order to perform the image compensation according to the difference between the frame data F0 and the frame data F1. It is understood that, during an interval from time T2 to time T3, the third data $F_{n-2}$ is the frame data F0 received by the image compensation circuit 180, the second data $F_{n-1}$ is the frame data F1 outputted from the frame rate converter circuit 160, and the first data $F_n$ is the frame data F2.

In time T4, the frame rate converter circuit 160 utilizes the write index 160-W to write the frame data F3 to the storage space 142. In other words, the frame data F0 stored in the storage space 142 will be overwritten to be the frame data F3. As a result, the frame rate converter circuit 160 and the image compensation circuit 180 may alternately utilize the multiple frame data stored in the storage spaces 142, 144, and 146 to perform the frame rate conversion and the image compensation. In time T4, the frame rate converter circuit 160 further utilizes the read index 160-R to read the frame data F2 from the storage space 146, and output the frame data F2 to be the video data DI (i.e., frame rate conversion). Moreover, in time T4, the image compensation circuit 180 utilizes the read index 180-R to read the frame data F1 from the storage space 144, and compares the received frame data F1 with the frame data F2 outputted from the frame rate converter circuit 160, in order to perform the image compensation according to the difference between the frame date F1 and the frame data F2.

From FIG. 2, it is understood that, the image compensation circuit 180 may perform image compensation without writing frame data, and may share the storage spaces 142, 144, and 146 of the memory circuit 140 with the frame rate converter circuit 160. As a result, a transmission bandwidth of the memory circuit 140 in a single time can be saved, and is thus able to meet requirements of high resolution and/or high frame rate applications.

Figure 3:
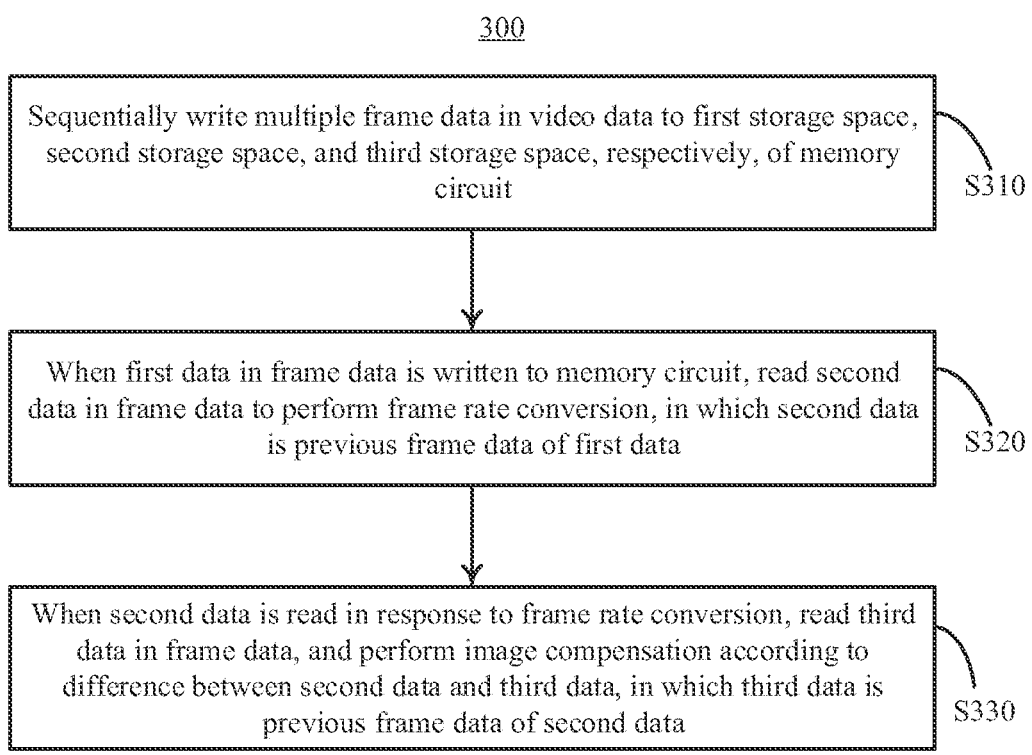
FIG. 3 is a flow chart of a video processing method according to some embodiments of the present disclosure.

FIG. 3 is a flow chart of a video processing method 300 according to some embodiments of the present disclosure. In some embodiments, the video processing method 300 may be (but not limited to) performed by the video processor chip 100 in FIG. 1.

In operation S310, multiple frame data in a video data are sequentially written to a first storage space, a second storage space, and a third storage space, respectively, of a memory circuit.

In operation S320, when first data of the frame data is written to the memory circuit, second data of the frame data is read from the memory circuit to perform the frame rate conversion, in which the second data is a previous frame data of the first data.

In operation S330, when the second data is read in response to the frame rate conversion, third data in the frame data is read from the memory circuit, and the image compensation is performed according to a difference between the second data and the third data, in which the third data is a previous frame data of the second data.

The above operations of the video processing method 300 can be understood with reference to various embodiments discussed above, and thus the repetitious descriptions are not given. The above description of the video processing method 300 includes exemplary operations, but the operations are not necessarily performed in the order described above. Operations of the video processing method 300 may be added, replaced, changed order, and/or eliminated as appropriate, or the operations are able to be executed simultaneously or partially simultaneously as appropriate, in accordance with the spirit and scope of various embodiments of the present disclosure.

As described above, with the video processor chip and the video processing method in some embodiments of the present disclosure, the bandwidth requirement of the memory circuit can be effectively reduced. As a result, it is able to utilize the existing memory to process video data with high resolution and/or high frame rate.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely some embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A video processor chip, comprising:
    a memory circuit comprising a first storage space, a second storage space, and a third storage space;
    a frame rate converter circuit configured to sequentially write a plurality of frame data in video data to the first storage space, the second storage space, and the third storage space, respectively, wherein the frame rate converter circuit finishes writing first data in the plurality of frame data to the memory circuit and reads second data in the plurality of frame data from the memory circuit to perform a frame rate conversion in a first time, and the second data is a previous frame data of the first data; and
    an image compensation circuit configured to read third data in the plurality of frame data from the memory circuit and perform an image compensation according to a difference between the second data and the third data in the first time, wherein the third data is a previous frame data of the second data.

2. The video processor chip of claim 1, wherein the image compensation circuit does not write the plurality of frame data to the memory circuit.

3. The video processor chip of claim 1, wherein the plurality of frame data are a plurality of successive image data.

4. The video processor chip of claim 1, wherein the plurality of frame data sequentially comprise first frame data, second frame data, and third frame data, and the frame rate converter circuit is configured to write the first frame data to the first storage space, write the second frame data to the second storage space, and write the third frame data to the third storage space.

5. The video processor chip of claim 4, wherein the plurality of frame data further comprise fourth frame data, and the frame rate converter circuit is further configured to write to the fourth frame data to the first storage space, in order to overwrite the first frame data.

6. The video processor chip of claim 1, wherein the first data is a next image data that follows the second data.

7. The video processor chip of claim 1, wherein the second data is a next image data that follows the third data.

8. A video processing method, comprising:
    sequentially writing a plurality of frame data in video data to a first storage space, a second storage space, and a third storage space, respectively, of a memory circuit, wherein writing first data in the plurality of frame data to the first storage space is finished in a first time;
    reading second data in plurality of frame data from the memory circuit to perform a frame rate conversion in the first time, wherein the second data is a previous frame data of the first data; and
    reading third data in the plurality of frame data from the memory circuit and performing an image compensation according to a difference between the second data and the third data in the first time, wherein the third data is a previous frame data of the second data.

9. The video processing method of claim 8, wherein the image compensation is performed by an image compensation circuit, and the image compensation circuit does not write the plurality of frame data to the memory circuit.

10. The video processing method of claim 8, wherein the plurality of frame data are a plurality of successive image data.

11. The video processing method of claim 8, wherein the plurality of frame data sequentially comprise first frame data, second frame data, and third frame data, and sequentially writing the plurality of frame data in the video data to the first storage space, the second storage space, and the third storage space, respectively, of the memory circuit comprises:
    writing the first frame data to the first storage space;
    writing the second frame data to the second storage space; and
    writing the third frame data to the third storage space.

12. The video processing method of claim 11, wherein the plurality of frame data further comprise fourth frame data, and sequentially writing the plurality of frame data in the video data to the first storage space, the second storage space, and the third storage space, respectively, of the memory circuit further comprises:
    writing the fourth frame data to the first storage space, in order to overwrite the first frame data.

13. The video processing method of claim 8, wherein the first data is a next image data that follows the second data.

14. The video processing method of claim 8, wherein the second data is a next image data that follows the third data.

* * * * *